United States Patent
Singh et al.

(10) Patent No.: US 11,139,884 B1
(45) Date of Patent: Oct. 5, 2021

(54) DIFFERENTIAL DISTRIBUTION OF WIRELESS RELAY BACKHAUL TRAFFIC AMONG CARRIERS BASED ON WHETHER TRAFFIC IS CONTROL-PLANE WITH RELAY BASE STATION OR RATHER USER-PLANE WITH RELAY-SERVED DEVICE

(71) Applicant: Sprint Spectrum L.P., Overland Park, KS (US)

(72) Inventors: Jasinder P. Singh, Olathe, KS (US); Siddharth S. Oroskar, Overland Park, KS (US); Nitesh Manchanda, Overland Park, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 658 days.

(21) Appl. No.: 14/962,582

(22) Filed: Dec. 8, 2015

(51) Int. Cl.
*H04B 7/155* (2006.01)
*H04W 72/04* (2009.01)

(52) U.S. Cl.
CPC ..... *H04B 7/15542* (2013.01); *H04B 7/15507* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 8,274,925 B2 * | 9/2012 | Jacks | H04B 7/18558 370/316 |
| 2003/0114167 A1 * | 6/2003 | Chen | H04W 28/10 455/453 |
| 2007/0076649 A1 * | 4/2007 | Lin | H04W 76/025 370/328 |
| 2012/0120831 A1 * | 5/2012 | Gonsa | H04W 76/15 370/252 |
| 2012/0176962 A1 * | 7/2012 | Kimura | H04B 7/155 370/315 |
| 2012/0307757 A1 * | 12/2012 | Edler Von Elbwart | H04L 1/0026 370/329 |
| 2013/0044654 A1 * | 2/2013 | Chen | H04L 5/0023 370/280 |
| 2014/0044041 A1 * | 2/2014 | Moshfeghi | H04W 84/00 370/328 |
| 2014/0050090 A1 * | 2/2014 | Nordstrom | H04W 72/1247 370/232 |
| 2014/0106764 A1 * | 4/2014 | Huang | H04W 72/1252 455/452.1 |
| 2015/0045032 A1 * | 2/2015 | Tomici | H04W 36/04 455/436 |

* cited by examiner

*Primary Examiner* — Steve R Young (57) ABSTRACT

When a donor base station serves a relay on a wireless backhaul connection that encompasses at least two carriers, and where the relay includes a relay base station and a relay-WCD, communications over the wireless backhaul connection will be distributed among the carriers based on whether the communications are control-plane communications with the relay base station or rather user-plane communications with a WCD served by the relay base station. For instance, all such control-plane communication could be carried on one of the carriers, and all such user-plane communication could be carried instead on another of the carriers.

2 Claims, 5 Drawing Sheets

DIFFERENTIAL DISTRIBUTION OF WIRELESS RELAY BACKHAUL TRAFFIC AMONG CARRIERS BASED ON WHETHER TRAFFIC IS CONTROL-PLANE WITH RELAY BASE STATION OR RATHER USER-PLANE WITH RELAY-SERVED DEVICE

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve wireless client devices (WCDs) such as cell phones, tablet computers, tracking devices, embedded wireless modules, and other wirelessly equipped devices, whether or not user operated. In turn, each base station may be coupled with a switch or gateway that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

Further, such a network may operate in accordance with a particular radio access protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others. Each protocol may define its own procedures for registration of WCDs, initiation of communications, handover between base station coverage areas, and other functions.

Each base station may provide wireless service to WCDs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a WCD on a single such carrier at a time or, with carrier aggregation service or the like, on multiple such carriers at a time.

Further, each base station in such a network may be communicatively linked with a signaling controller that carries out various network control functions, such as managing setup of bearer connections between the base station and one or more transport networks, tracking were WCDs are located in the network, paging WCDs, and the like. In addition, neighboring base stations may be communicatively linked with each other, to facilitate handover and other inter-base station signaling.

By way of example, in an LTE network, each base station (LTE evolved Node-B (eNodeB)) has a communication interface with a signaling controller known as a mobility management entity (MME), the base station and MME each also have a respective communication interface with a gateway system that provides connectivity with a packet-switched transport network, and the base station has a communication interface with each of its neighboring base stations. Typically, the nodes of such an LTE network would sit on a wireless service provider's core packet-switched network (e.g., a network compliant with the industry standard system architecture evolution (SAE) for the LTE protocol), and so the base station and each other network entity (e.g., MME, gateway, and neighboring base station) may each have an assigned Internet Protocol (IP) address on that network, and the interfaces between these entities may be defined as logical connections (e.g., established virtual tunnels) through that network.

In example operation, when a WCD enters into coverage of an LTE base station on a particular carrier, the WCD signals to the base station to initiate an attach process and to establish a radio-link-layer connection with the base station. In this process, the base station signals to the MME, the MME authenticates the WCD, the MME and base station obtain and store a context/profile record for the WCD, and the gateway system assigns an IP address to the WCD for use by the WCD to communicate on the packet-switched transport network. Further, at this point or later, the MME may engage in signaling with the base station and the gateway system to establish for the WCD one or more bearers for carrying packet data between the WCD and the transport network. Each such may have an associated quality of service (QoS) level indicated by a QoS class identifier (QCI) value, and packets transmitted on a given bearer could be tagged with the QCI value or a corresponding differentiated services point code (DSCP) value, so that network entities can route and otherwise handle the packets with an appropriate QoS level (e.g., with appropriate routing priority, etc.)

Once a WCD is so attached with a base station, the base station then serves the WCD on one or more carriers, managing downlink communication of packet data to the WCD and uplink communication of packet data from the WCD. For example, as the gateway system receives packet data destined to the WCD, the gateway system may forward the packet data to the base station, and the base station may schedule and provide transmission of that data to the WCD on the WCD's serving carriers. Likewise, as the WCD has packet data to transmit on the transport network, the WCD may transmit a scheduling request to the base station, the base station may schedule transmission of that data from the WCD on the WCD's serving carriers, the WCD may accordingly transmit the data to the base station, and the base station may then forward the data to the gateway system for output on the transport network.

In normal operation, when a base station operates in such a wireless network, the base station may thus engage in various types of communication with other network entities. Such communication could be categorized into "control-plane communication" and "user-plane communication". The control-plane communication encompasses any of the base station's control signaling with other core network entities to help manage operations in the wireless network and service of WCDs, and could thus include communications such as bearer setup signaling, tracking area update signaling, paging, handover signaling, the like. Whereas, the user-plane communication encompasses bearer data being communicated to or from one or more WCDs served by the base station, such as packet data that the base station receives from a gateway system and then schedules/transmits to a WCD and packet data that the base station receives from a WCD and forwards to a gateway system for transmission on a transport network.

Optimally, a wireless service provider will strategically implement base stations throughout a market area so that served WCDs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled (e.g., via a local area network or other connection) with a WCD, referred to as a relay-WCD, and the donor base station then serves the relay-WCD in much the same way that the donor base station serves other WCDs. Further, the relay base station itself serves WCDs, in much the same way that any base station would.

With this arrangement, when the relay-WCD attaches with the donor base station, the relay-WCD may acquire connectivity and an IP address as discussed above for instance. But based on a profile record for the relay-WCD, the network (e.g., a signaling controller) may recognize that the relay-WCD is a relay-WCD (rather than a normal end-user WCD) and may therefore set up a bearer connection for that relay-WCD with a special gateway system that provides for internal core network connectivity and assigns the relay-WCD with an IP address for use to communicate within the core network. Once the relay-WCD receives that core network IP address assignment, the relay-WCD may then convey that IP address to the relay base station for use by the relay base station as the relay base station's IP address on the core network. The relay base station may then operate as a full-fledged base station of the network, having IP-based interfaces with other core network entities (e.g., a signaling controller, a gateway system, and other base stations), albeit with those interfaces passing via the wireless backhaul connection provided by the relay-WCD, and via the special gateway system.

Once the relay base station is thus in operation, the relay base station may then serve WCDs in the same way as a standard base station serves WCDs. Thus, when a WCD enters into coverage of the relay base station, the WCD may signal to the relay base station to initiate an attach process, the WCD may acquire an IP address, and an MME may engage in signaling to establish one or more bearers between the WCD and a gateway system. Each of these bearers, though, like the relay base station's signaling communication, would pass via the relay's wireless backhaul connection.

OVERVIEW

With a relay arrangement, the communication traffic that flows over the wireless backhaul connection between the relay-WCD and the donor base station will likely include both control-plane communication with the relay base station and user-plane communication with one or more WCDs served by the relay base station.

Further, when a donor base station is serving one or more relay-WCDs and perhaps other WCDs, the carriers on which the donor base station provides service may have different and varying levels of load (e.g., carrying different extents of communication per unit time and/or serving different quantities of WCDs per unit time). Thus, it is possible that one or more of the donor base station's carriers may at times be heavily loaded. In turn, due to the limited extent of resources on each carrier, this heavy load on a carrier could result in problems, such as delays in scheduling and transmission of communications to and from WCDs on the carrier.

Given a relay that includes a relay base station and a relay-WCD, if a donor base station serves the relay-WCD on a carrier that is heavily loaded, that heavy load could pose a special problem for control-plane communications that flow via that carrier between the relay base station and other core network entities. For instance, the heavy load on the carrier could cause delays in scheduling of those control-plane communications, which could in turn lead to delays in handover, paging, bearer setup, or the like, and those delays could then lead to poor user experience. By way of example, heavy load on the carrier could result in delays in transmission of handover setup signaling between the relay base station and adjacent base stations, which could lead to dropped calls or other issues. And as another example, heavy load on the carrier could result in delays in transmission of handover signaling or bearer-setup signaling between the relay base station and the MME, which lead to dropped or blocked calls or other issues as well.

Disclosed herein is a method and system that may help to address this or other issues. In accordance with the disclosure, when a donor base station serves a relay-WCD on a wireless backhaul connection that encompasses at least two carriers, communications over that wireless backhaul connection will be distributed among the carriers based on whether the communications are control-plane communications with the relay base station or rather user-plane communications with a WCD served by the relay base station. For instance, all such control-plane communication could be carried on one of the carriers, and all such user-plane communication could be carried instead on another of the carriers.

In a specific implementation of this, if the donor base station is initially serving the relay-WCD on just a first carrier, the donor base station may detect that load on that carrier is threshold high, and the donor base station may responsively add a second, possibly less loaded, carrier to its service of the relay-WCD. The donor base station and relay-WCD may then use the first (possibly more loaded) carrier for user-plane communications with relay-served WCDs and use the second (possibly less loaded) carrier for control-plane communications with the relay base station.

Accordingly, in one respect, disclosed is a method for managing wireless backhaul communication between a donor base station and a relay, where the relay comprises a relay-WCD and a relay base station, where the donor base station serves the relay-WCD over an air interface defining a wireless backhaul connection for the relay, and where the relay base station serves one or more WCDs. In accordance with the disclosure, the method involves configuring the air interface to encompass at least two mutually-exclusive carriers, including a first carrier and a second carrier. Further, the method involves differentially distributing among the at least two carriers instances of traffic being communicated between the donor base station and the relay-WCD, where the differential distributing is based on whether the instances of traffic are (i) control-plane communication with the relay base station or rather (ii) user-plane communication with a WCD served by the relay base station.

In another respect, disclosed is a donor base station operable in an access network, where the donor base station serves a relay over an air interface defining a wireless backhaul connection for the relay, where the relay comprises a relay base station and a relay-WCD and the donor base station serves the relay by serving the relay-WCD, where the air interface encompasses at least two mutually exclusive carriers including a first carrier and a second carrier, and where the relay base station serves one or more WCDs. In accordance with the disclosure, the donor base station includes an antenna structure for communicating over the air interface with the relay-WCD. Further, the donor base station includes a controller configured to differentially distribute among the first and second carriers instances of traffic being communicated between the donor base station and the relay-WCD, where the differential distribution is based on whether the instances of traffic are (i) control-plane communication with the relay base station or rather (ii) user-plane communication with a WCD served by the relay base station.

And in still another respect, disclosed is a system for managing wireless backhaul communication. In accordance with the disclosure, the system includes a donor base station and a relay. Further, the relay comprises a relay-WCD and a relay base station, the donor base station serves the relay-WCD over an air interface defining a wireless backhaul connection for the relay, and the relay base station serves one or more WCDs. And the air interface encompasses at least two mutually-exclusive carriers, including a first carrier and a second carrier. Per the disclosure, the donor base station and relay-WCD are configured to differentially allocate among the at least two carriers instances of traffic being communicated between the donor base station and the relay-WCD, where the differential allocation is based on whether the instances of traffic are (i) control-plane communication with the relay base station or rather (ii) user-plane communication with a WCD served by the relay base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example radio access protocol and associated network arrangement. However, it will be understood that principles of the disclosure can extend to apply in other scenarios as well, such as with respect to other radio access protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
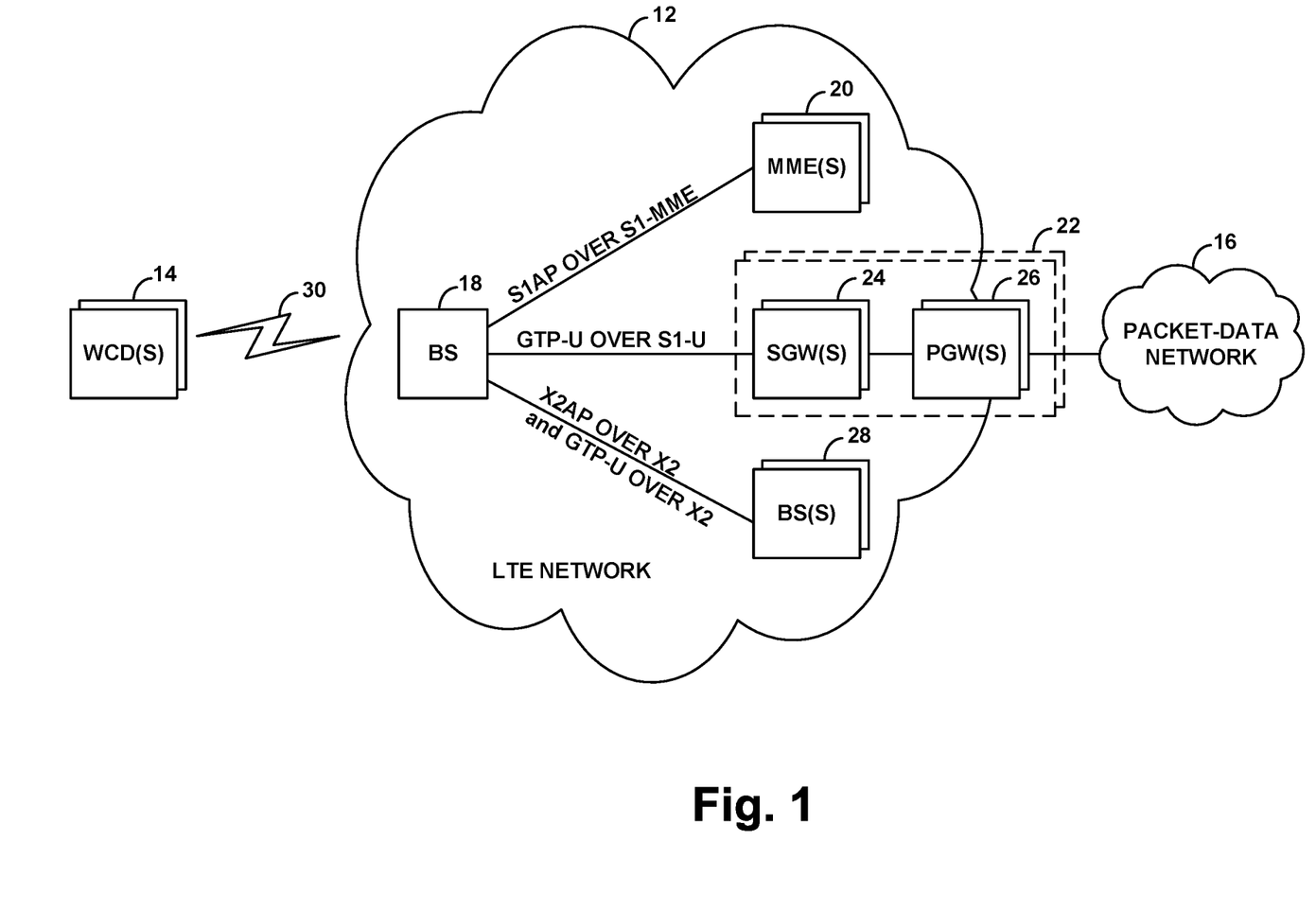
FIG. 1 is a simplified block diagram of an example wireless communication system.

Referring to the drawings, as noted above, FIG. 1 is a simplified block diagram of a wireless communication system in which the present method and system can be implemented. In particular, FIG. 1 depicts a representative LTE network 12, which functions primarily to serve WCDs 14 with wireless packet data communication service, enabling the WCDs to communicate on an external packet data network 16.

As shown, the example LTE network 12 includes a representative base station (BS) 18, one or more MMEs 20, one or more gateway systems 22 including one or more serving gateways (SGWs) 24 and one or more packet data network gateways (PGWs) 26 that provide connectivity with the external packet data network 16, and one or more other base stations 28. As noted above, the entities of the LTE network 12 may sit as nodes on a core packet-switched network and may thus each have an IP address on that network.

Base station 18 has an antenna structure and associated equipment (not shown) for providing LTE coverage in which to serve representative WCDs 14 within a coverage area defining an air interface 30. Further, base station 18 has logical communication interfaces (e.g., virtual tunnels through the core network) through which base station 18 engages in communication with various other ones of the core network entities. Some of these interfaces may be established for general use by the base station 18, and other interfaces may be established as needed for use to serve individual WCDs. For instance, base station 18 may have a generally established X2 interface respectively with each adjacent base station 28. And for each served WCD, base station 18 may have an S1-MME interface with an MME 20 and an S1-U interface with an SGW 24.

In practice, communications over these and other interfaces to and from base station 18 may include both control-plane communication and user-plane communication as discussed above.

In the arrangement shown, for instance, control-plane communication may include signaling with MMES according to the S1 application protocol (S1AP) (e.g., per 3GPP TS 36.413), such as control signaling for radio bearer management, S1 interface management, initial context transfer, non-access stratum (NAS) signaling transport, locating reporting, MME-based handover or mobility management, inter-cell interference coordination, and paging, among other functions. Further, control-plane communication could also include signaling with adjacent base stations 28 according to the X1 application protocol (X2AP) (e.g., per 3GPP TS 36.423), such as control signaling for inter-base station handover or mobility management, load management, X2 interface management, coordinated multipoint service, and base station configuration updating.

As a specific example, control-plane communication could include handover signaling to support handover of a served WCD between base station 18 and an adjacent base station 20. In particular, as a WCD moves between base station coverage areas, the WCD may need to hand over from one base station to another, to maintain connectivity and session continuity, and thus to avoid dropped calls and connections. To prepare for handover, base station 18 may engage in X2AP handover signaling with the adjacent base station 20 and/or S1AP handover signaling with an MME (which may in turn engage in S1AP handover signaling with the adjacent base station 20). And once handover preparations are complete, the WCD may then transition from being served by one base station to being served by another base station.

Further, as another example, control-plane communication could include bearer setup signaling to support establishment of a new bearer for carrying user data to/from a served WCD. For instance, if base station 18 is serving a WCD and the WCD initiates an application-specific session such as a voice-over-IP call or the LTE network seeks to set up such a session with the WCD, the base station 18 may engage in S1AP signaling with an MME 20 to facilitate setup of a dedicated bearer tunnel between the base station 18 and the SGW 24 for carrying user data for the session.

User-plane communication in the example arrangement is then communication of user data, such as WCD bearer data communications flowing between the WCD and the external packet-data network 16. Such user-plane communication may pass between entities of the core network according to the General Packet Radio Service (GPRS) tunneling protocol (GTP), with user data being encapsulated in GTP headers. For instance, when packet data destined to a particular WCD arrives over packet-data network 16 at a PGW 26, the PGW 26 may encapsulate the packet data in GTP-U packets and pass the GTP-U packets to an SGW 24, the SGW 24 may pass the GTP-U packets over an S1-U interface to the base station 18, and the base station may transmit the underlying packet data over the air interface 30 to the WCD. Likewise, when the base station 18 receives packet data from a WCD, the base station 18 may encapsulate the packet data in GTP-U packets and pass the GTP-U packets to an SGW 24, the SGW 24 may pass the GTP-U packets to a PGW 26, and the PGW 26 may output the underlying packet data onto packet-data network 16.

Further, some GTP-U user plane communication may occur over an X2 interface as well. For instance, when a WCD is being handed over between base station 18 and an adjacent base station 20, if the source base station has packet-data buffered for transmission to the WCD, the source base station could transmit that buffered data as GTP-U packets over an X2 interface to the target base station, so that the target base station can deliver the underlying packet data to the WCD.

FIG. 1 depicts some of this control-plane and user-plane communication by way of example. In particular, FIG. 1 depicts (i) S1AP control-plane communication over an S1-MME interface between base station 18 and one or more MMES, (ii) GTP-U user-plane communication over an S1-U interface between base station 18 and one or more SGWs, (iii) X2AP control-plane communication over an X2 interface between base station 18 and one or more adjacent base stations 20, and (iv) GTP-U user-plane communication over an X2 interface between base station 18 and one or more adjacent base stations 20. Various other examples of control-plane communication and user-plane communication may be possible as well.

Figure 2:
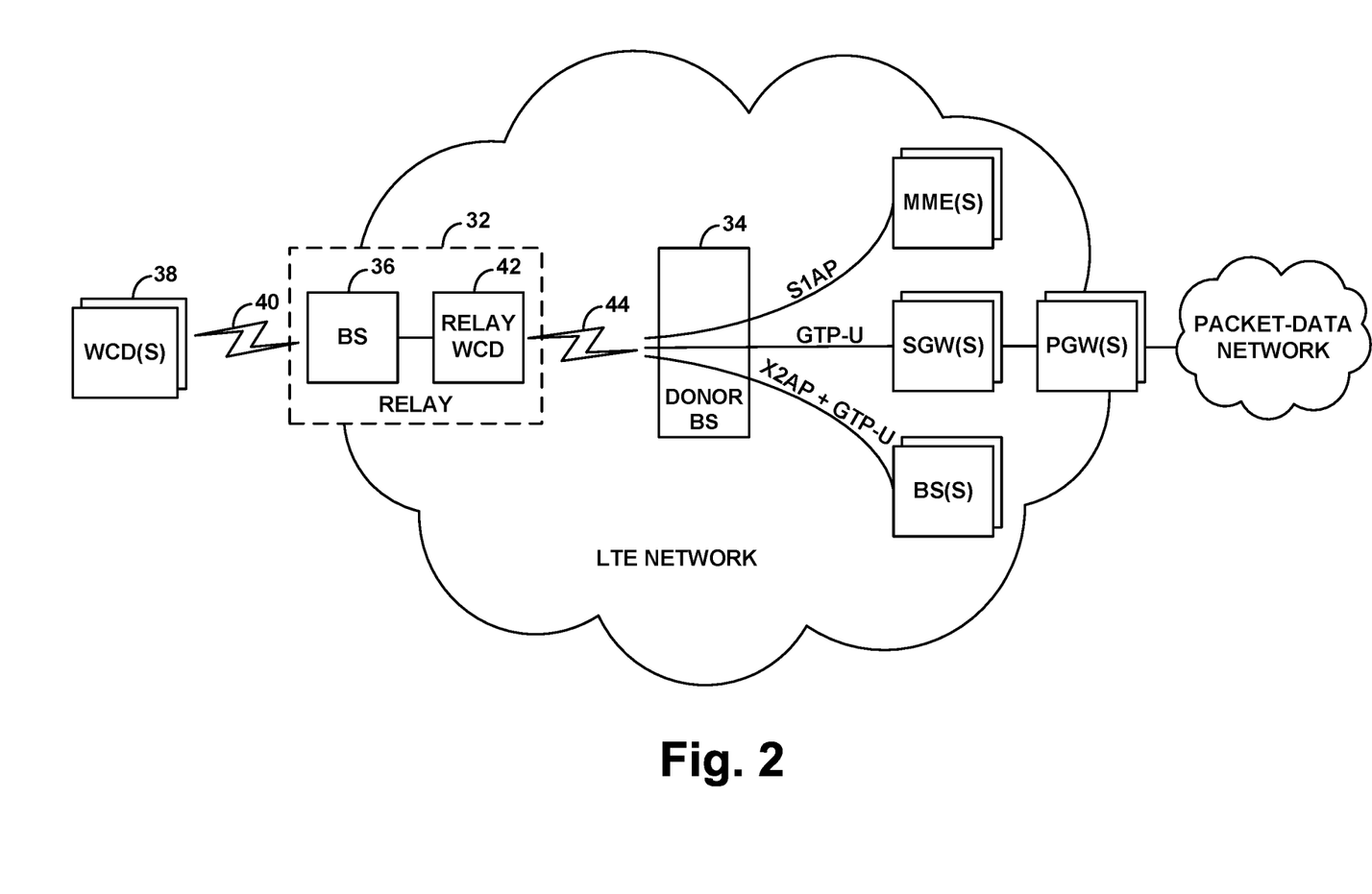
FIG. 2 is a simplified block diagram of an enhanced wireless communication system including a relay.

Turning next to FIG. 2, an enhancement of the arrangement of FIG. 1 is shown. In this enhanced arrangement, the LTE network additionally includes a relay 32, which has a wireless backhaul connection with a donor base station 34. In particular, relay 32 includes a relay base station 36 configured to serve WCDs 38 over an air interface 40 much like base station 18 discussed above, and relay 32 further includes a relay-WCD 42 that is attached with and served by donor base station 36 over an air interface 44 defining the wireless backhaul connection.

With this arrangement, relay base station 36 may engage in control-plane communication and user-plane communication with various core network entities in the same way as base station 18 would, but those control-plane and user-plane communications would pass over the wireless backhaul connection provided by donor base station 34 that serves the relay-WCD 42, and between relay-WCD 42 and relay base station 36. Thus, when the relay base station 36 engages in S1AP, X2AP, or GTP-U communication with other core network entities as described above, those communications would pass via the relay-WCD 42, via the wireless backhaul communication over air interface 44, via donor base station 34, and likely via a special SAE gateway system in the core network. As result, with this arrangement, the communications passing over the air interface between donor base station 34 and relay-WCD 42 may include both control-plane communications with relay base station 36 and user-plane communication with one or more WCDs served by the relay base station.

In practice, donor base station 34 may have limited air interface resources on which to engage in communications with relay-WCD 42. In particular, in line with the discussion above, donor base station 36 may provide service on one or more carriers each having a defined, finite frequency bandwidth, and each carrier may have a limited extent of resources for carrying communications between the donor base station and one or more served WCDs including relay-WCD 42. Specifically, the carrier may be divided over time into transmission time intervals (TTIs) and, in each TTI, into control channel space and shared channel space, the control channel space may carry scheduling communications and other control signals between donor base station 34 and served WCDs, and the shared channel space may carry scheduled communications between donor base station 34 and served WCDs.

As further noted above, the limited extent of resources per carrier may result in each carrier having a particular level of load that may vary over time. Carrier load could be defined in various ways, perhaps averaged over a recent sliding window of time. For example, the load could be defined as an extent (e.g., percentage or other measure) of all carrier resources used (e.g., carrying communications), an extent of shared channel resources used, an extent of control channel resources used, or a quantity of WCDs served on the carrier (perhaps those having active or connected state). Other examples are possible as well.

As noted above, difficulty can arise when a carrier on which a donor base station is serving a relay-WCD is heavily loaded. In particular, as noted, that heavy load may result in delayed transmission of communications between the donor base station and the relay-WCD, which could pose problems with control-plane communications passing to and from relay base station 36. For example, as further noted, delays in control-plane communication with relay base station 36 could result in issues such as dropped or blocked calls.

The present method and system may help address this or other problems by differentially distributing traffic on the wireless backhaul connection such that control-plane communications and user-plane communications occur on separate carriers. Optimally, for example, control-plane communications could be transmitted on a relatively lightly loaded carrier (perhaps a relatively wide bandwidth carrier), to help minimize delay of such communications, while user-plane communications could be transmitted on another, possibly more heavily loaded, carrier.

Features of this method and system can be carried out at the donor base station 36 and/or at the relay-WCD 42. In practice, for instance, both the donor base station 36 and the relay-WCD 42 could be configured to determine whether traffic to be communicated between the donor base station 36 and the relay-WCD is control-plane communication or is rather user-plane communication, and, based on that determination, to communicate the traffic on one carrier or the other. Thus, if the determination is that the traffic is control-plane communication, then the donor base station and relay-WCD could responsively communicate that traffic on a carrier designated for use to carry control-plane communication, but if the determination is that the traffic is user-plane communication, then the donor base station and relay base station could responsively communicate that traffic on a carrier designated for use to carry user-plane communication.

To facilitate this, when relay-WCD attaches, the LTE network could establish for the relay-WCD 42 two separate bearers each having a different respective QCI, with the QCI of one bearer denoting control-plane communication and the QCI of the other bearer denoting indicate user-plane communication. Further, the donor base station and relay-WCD could each be configured to map those QCIs to associated carriers, one for control-plane communication and another for user-plane communication. Further, entities in communication with the relay-WCD and donor base station could be configured to tag packet data with the corresponding QCIs (or associated DSCP values), so that the relay-WCD and donor base station can determine whether each such packet is control-plane communication or user-plane communication and can communicate it on the associated carrier.

For instance, for communication of packets from the relay base station to other core network entities such as an MME, SGW, or adjacent base station, the relay base station could mark packets with QCI or DSPC values to indicate for each packet whether the packet is control-plane communication (e.g., S1AP or X2AP communication) or rather user-plane communication (e.g., GTP-U communication). Thus, when the relay base station provides each such marked packet to the relay-WCD for transmission over the wireless backhaul connection to the donor base station, the relay-WCD could read the QCI or DSCP value to determine whether to transmit the packet to the donor base station on the carrier designated for use to carry control-plane communications or rather on the carrier designated to carry user-plane communications. And the relay-WCD may transmit the packet accordingly.

Likewise, communication of packets to the relay base station from another core network entity such as an MME, SGW, or adjacent base station, the other core network entity could mark packets with QCI or DSPC values to indicate for each packet whether the packet is control-plane communication (e.g., S1AP or X2AP communication) or rather user-plane communication (e.g., GTP-U communication). Thus, when the donor base station receives each such marked packet for transmission over the wireless backhaul connection to the relay-WCD (for forwarding to the relay base station), the donor base station could read the QCI or DSCP value to determine whether to transmit the packet to the relay-WCD on the carrier designated for use to carry control-plane communications or rather on the carrier designated to carry user-plane communications. And the relay-WCD may transmit the packet accordingly.

In practice, the relay-WCD may have a single radio-link-layer connection (e.g., Radio Resource Control (RRC)) connection with the donor base station, and that radio-link-layer connection could encompass both of the carriers at issue. For instance, the donor base station might serve the relay-WCD initially on just one carrier and could detect that the load on that carrier is higher than a predefined threshold (e.g., a threshold load at which problems like those noted above might occur) and could responsively then add to the relay-WCD's radio-link-layer connection a second carrier, such as one that the donor base station determines is not so threshold loaded or has lower than a threshold level of load. And in adding that second carrier, the donor base station could inform the relay-WCD (e.g., in RRC configuration messaging) that the second carrier is to be used for control-plane communication and the first carrier is to be used for user-plane communication.

As the relay-WCD has packets to transmit to the donor base station, the relay-WCD could then transmit those packets on the appropriate carriers. If the packets carry control-plane communication, then the relay-WCD could send to the donor base station an uplink scheduling request requesting allocation of resources on the second carrier. Whereas, if the packets carry user-plane communication, then the relay-WCD could send to the donor base station an uplink scheduling request requesting allocation of resources on the first carrier. And upon allocation of such resources, can then transmit the control-plane communication accordingly.

Likewise, as the donor base station has packets to transmit to the relay-WCD, the donor base station could transmit those packets on the appropriate carriers. If the packets carry control-plane communication, then the donor base station could schedule and transmit the communication on resources on the second carrier. Whereas, if the packets carry user-plane communication, then the donor base station could schedule and transmit the packets on resources on the first carrier.

Alternatively, the relay-WCD could have two separate radios and could use one for control-plane communication with the donor base station and the other for user-plane communication with the donor base station. In this implementation, the donor base station might serve just a first radio of the relay-WCD on a first carrier. Upon detecting threshold load on that carrier as noted above, the donor base station may then page the relay-WCD's second radio and establish a second radio-link-layer connection with that second radio on a second, less loaded carrier. Processing may then occur in the manner noted above, with the relay-WCD and donor base station exchanging control-plane communication on the second carrier and user-plane communication on the first carrier.

Figure 3:
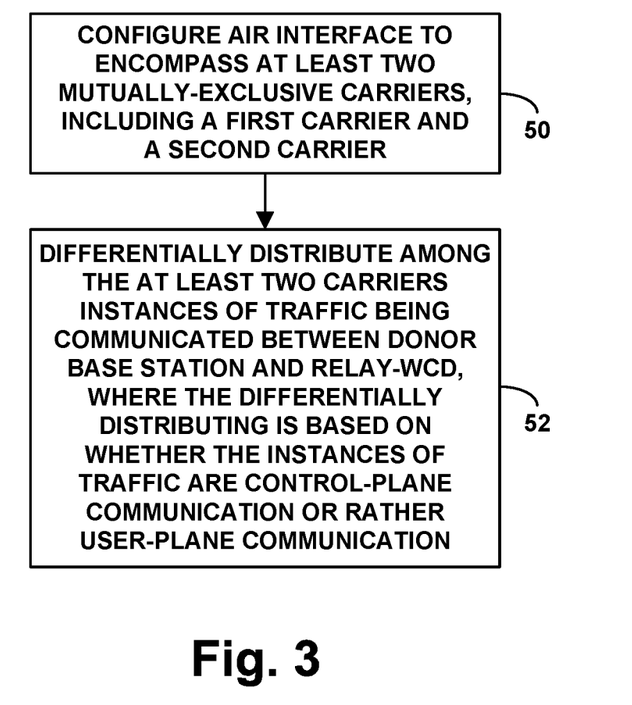
FIG. 3 is a flow chart depicting operations in accordance with the disclosure.

FIG. 3 is next a flow chart depicting a method for managing wireless backhaul communication between a donor base station and a relay, where the relay comprises a relay-WCD and a relay base station, where the donor base station serves the relay-WCD over an air interface defining a wireless backhaul connection for the relay, and where the relay base station serves one or more WCDs. As shown in FIG. 3, at block 50, the method involves configuring the air interface to encompass at least two mutually-exclusive carriers, including a first carrier and a second carrier. And at block 52, the method involves differentially distributing among the at least two carriers instances of traffic (e.g., packets) being communicated between the donor base station and the relay-WCD, where the differentially distributing is based on whether the instances of traffic are control-plane communication (e.g., S1AP or X2AP) with the relay base station or rather user-plane communication (e.g., GTP-U) with a WCD served by the relay base station.

In line with the discussion above, the relay-WCD may pass to the relay base station downlink communications that the relay-WCD receives over the air interface from the donor base station, and the relay-WCD may transmit over the air interface to the donor base station uplink communications that the relay-WCD receives from the relay base station. In that case, the instances of traffic differentially distributed could comprise instances of traffic each being either the downlink communication or the uplink communication.

Further as discussed above, the donor base station may provide connectivity with a core network that includes one or more signaling controllers, one or more other base stations, and one or more gateway systems that provide connectivity with an external packet-data network. And in that case, the act of differentially distributing the instances of traffic could be based on whether the instances of traffic are (i) control-plane communication such as (a) control signaling between the relay base station and a signaling controller of the one or more signaling controllers or (b) inter-base station control signaling with the relay base station, or are rather (ii) user-plane packet data communication between a WCD served by the relay base station and a gateway system of the one or more gateway systems.

In line with the discussion above, the act of differentially distributing the instances of traffic among the at least two carriers could involve (i) making a determination, per instance of the traffic, of whether the instance of traffic is control-plane communication with the relay base station or is rather user-plane communication with a WCD served by the relay base station, (ii) if the determination is that the instance of the traffic is control-plane communication with the relay base station rather than user-plane communication with a WCD served by the relay base station, then causing the instance of traffic to be communicated on the second carrier rather than on the first carrier, and (iii) if the determination is that the instance of the traffic is user-plane communication with a WCD served by the relay base station rather than control-plane communication with the relay base station, then causing the instance of traffic to be communicated on the first carrier rather than on the second carrier.

Further, the act of making the determination of whether the instance of traffic is the control-plane traffic or is rather the user-plane traffic could involve (i) if the instance of traffic is downlink communication, then the donor base station making the determination based on a header value (e.g., QCI or DSCP value) in the instance of traffic indicating whether the instance of traffic is the control-plane traffic or is rather the user-plane traffic, and (ii) if the instance of traffic is uplink communication, then the donor base station making the determination based on signaling from the relay-WCD (e.g., a scheduling request) indicating whether the instance of traffic is the control-plane traffic or is rather the user-plane traffic.

Moreover, as discussed above, before configuring the air interface to encompass at least the first and second carriers, the donor base station could serve the relay-WCD on at least the first carrier but not yet on the second carrier, in which case the act of configuring the air interface to encompass at least the first and second carriers could involve (i) while serving the relay-WCD on the first carrier and not yet on the second carrier, the donor base station making a first determination that the first carrier has threshold high load and (ii) responsive to at least the first determination, reconfiguring by the donor base station the air interface to encompass the second carrier in addition to the first carrier. Further, the donor base station could also make a second determination that the second carrier has threshold low load, and the reconfiguring could be responsive to at least both the first determination and the second determination.

Figure 4:
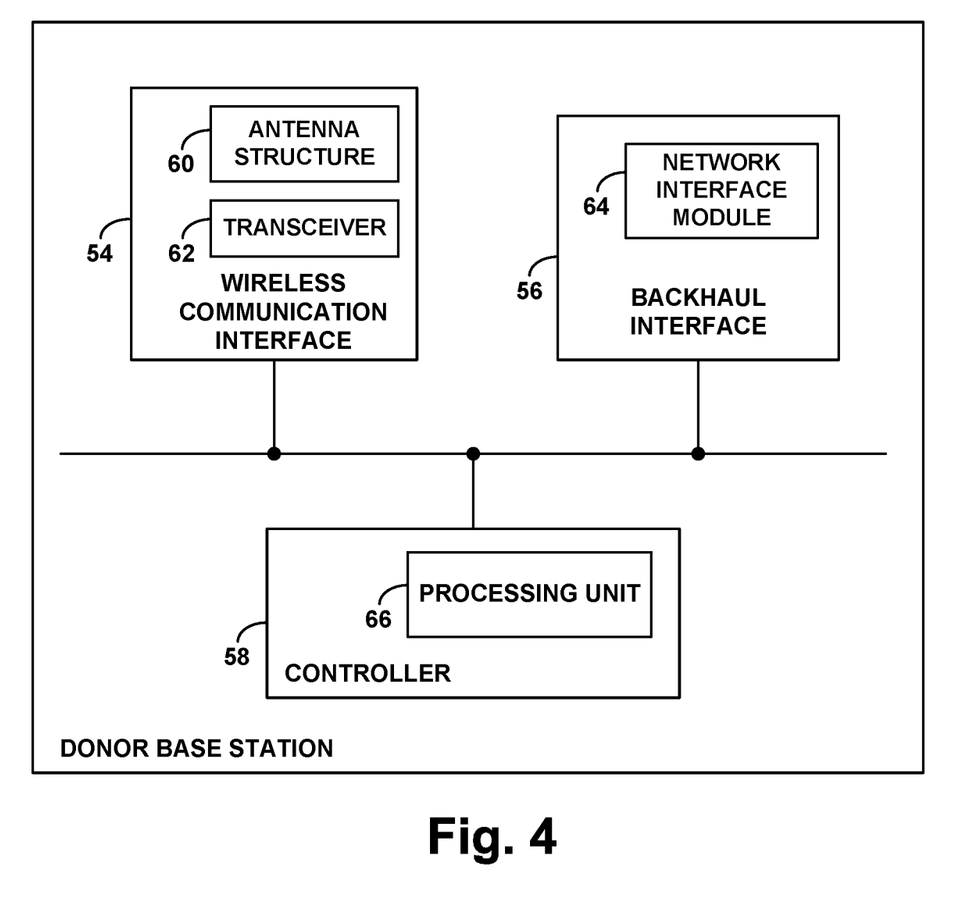
FIG. 4 is a simplified block diagram of a donor base station.

FIG. 4 is next a simplified block diagram of a donor base station (e.g., macro base station, small cell base station, or other form of a base station), showing some of the components that such an entity could include. As shown, the donor base station includes a wireless communication interface 54, a backhaul interface 56, and a controller 58, any or all of which could be integrated together in various ways.

The wireless communication interface 54 could include an antenna structure 60 and transceiver 62, for communicating over the air interface with a relay-WCD. The backhaul interface 56 could include a network interface module (e.g., Ethernet module) 64 for communicating with other core network entities. And the controller 58 could include a processing unit 66 (e.g., one or more microprocessors or the like) programmed with instructions to carry out various donor base station operations described above. As such, the controller may be configured to differentially distribute among first and second carriers (on an air interface over which the donor base station serves the relay-WCD) instances of traffic being communicated between the donor base station and the relay-WCD, where the differential distribution is based on whether the instances of traffic are (i) control-plane communication with the relay base station or rather (ii) user-plane communication with a WCD served by the relay base station.

Figure 5:
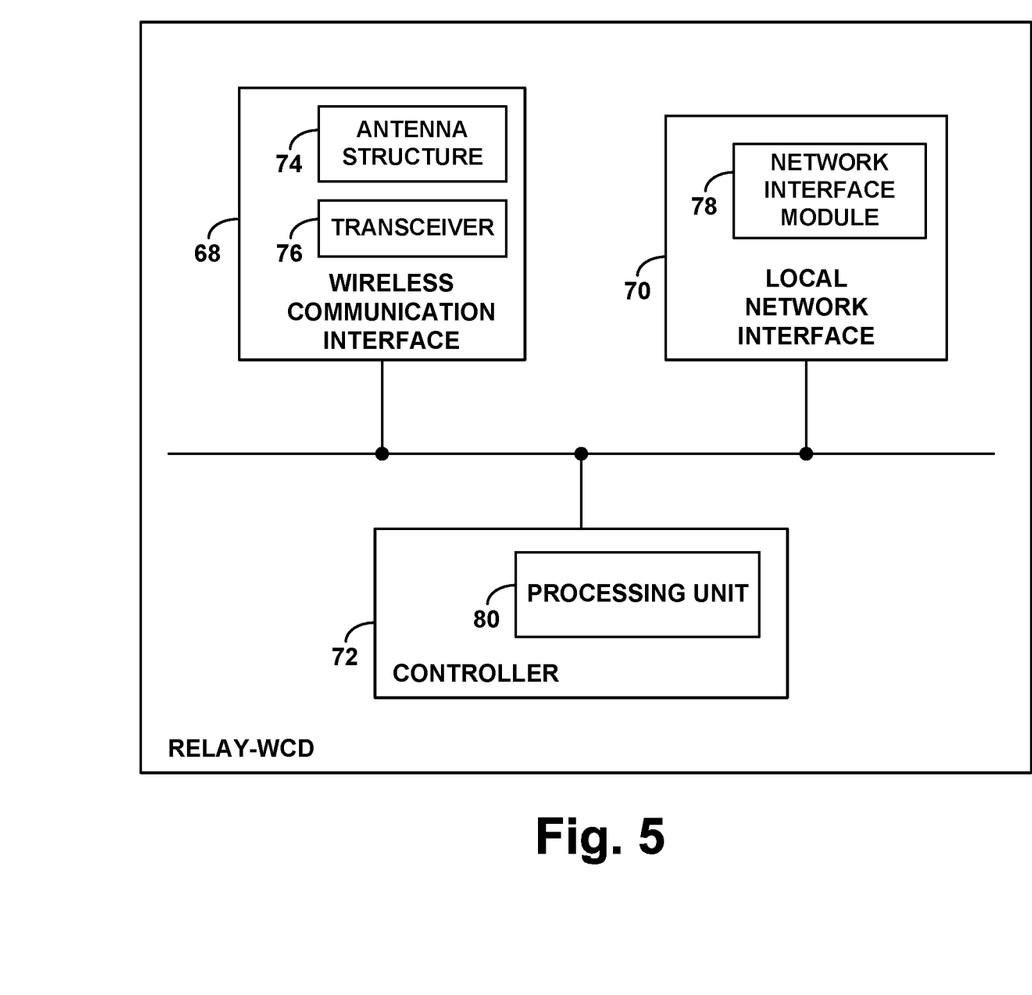
FIG. 5 is a simplified block diagram of a relay-WCD.

Finally, FIG. 5 is a simplified block diagram of a relay-WCD, showing some of the components that such an entity could include. As shown, the relay-WCD includes a wireless communication interface 68, a local network interface 70, and a controller 72, any or all of which could be integrated together in various ways.

The wireless communication interface 68 could include an antenna structure 74 and transceiver 76, for communicating over the air interface with a donor base station. The local network interface 70 could include a network interface module (e.g., Ethernet module) 78 for communicating with a relay base station. And the controller 72 could include a processing unit 80 (e.g., one or more microprocessors or the like) programmed with instructions to carry out various relay-WCD operations described above. As such, the controller may be configured to differentially distribute among first and second carriers (on an air interface over which the donor base station serves the relay-WCD) instances of traffic being communicated between the relay-WCD and the donor base station in the manner discussed above.

Exemplary embodiments have been described above. Those skilled in the art will understand, however, that changes and modifications may be made to these embodiments without departing from the true scope and spirit of the invention.

What is claimed is:

1. A method for managing wireless backhaul communication between a donor base station and a relay, wherein the relay comprises a relay wireless client device (relay-WCD) and a relay base station, wherein the donor base station serves the relay-WCD over an air interface defining a wireless backhaul connection for the relay, and wherein the relay base station serves one or more WCDs, the method comprising:

configuring the air interface to encompass at least two mutually-exclusive carriers, including a first carrier and a second carrier; and differentially distributing among the at least two carriers instances of traffic being communicated between the donor base station and the relay-WCD, wherein the differentially distributing, per instance of traffic, is based on whether the instance of traffic is (i) communication with the relay base station, the communication with the relay base station being control-plane communication or rather (ii) communication with a WCD served by the relay base station, the communication with the WCD served by the relay base station being user-plane communication, wherein, on the air interface over which the donor base station serves the relay-WCD, communication with the relay base station is carried on a different carrier than communication with one or more WCDs served by the relay base station;

wherein the relay-WCD passes to the relay base station downlink communications that the relay-WCD receives over the air interface from the donor base station, and wherein the relay-WCD transmits over the air interface to the donor base station uplink communications that the relay-WCD receives from the relay base station, and wherein the instances of traffic differentially distributed comprise instances of traffic each selected from the group consisting of the downlink communications and the uplink communications;

wherein the differentially distributing of the instances of traffic among the at least two carriers comprises:

making a determination, per instance of the traffic, of whether the instance of traffic is control-plane communication with the relay base station or is rather user-plane communication with a WCD served by the relay base station;

if the determination is that the instance of the traffic is control-plane communication with the relay base station rather than user-plane communication with a WCD served by the relay base station, then causing the instance of traffic to be communicated on the second carrier rather than on the first carrier; and if the determination is that the instance of the traffic is user-plane communication with a WCD served by the relay base station rather than control-plane communication with the relay base station, then causing the instance of traffic to be communicated on the first carrier rather than on the second carrier;

wherein making the determination of whether the instance of traffic is the control-plane traffic or is rather the user-plane traffic comprises:

if the instance of traffic is downlink communication, then the donor base station making the determination based on a header value in the instance of traffic indicating whether the instance of traffic is the control-plane traffic or is rather the user-plane traffic; and if the instance of traffic is uplink communication, then the donor base station making the determination based on signaling from the relay-WCD indicating whether the instance of traffic is the control-plane traffic or is rather the user-plane traffic;

wherein the header value comprises an indication selected from the group consisting of a differential services point code (DSCP) value and a quality of service class indicator (QCI) value, and wherein the signaling from the relay-WCD comprises a scheduling request for the instance of traffic.

2. A method for managing wireless backhaul communication between a donor base station and a relay, wherein the relay comprises a relay wireless client device (relay-WCD) and a relay base station, wherein the donor base station serves the relay-WCD over an air interface defining a wireless backhaul connection for the relay, and wherein the relay base station serves one or more WCDs, the method comprising:

configuring the air interface to encompass at least two mutually-exclusive carriers, including a first carrier and a second carrier; and differentially distributing among the at least two carriers instances of traffic being communicated between the donor base station and the relay-WCD, wherein the differentially distributing is based on whether the instances of traffic are (i) control-plane communication with the relay base station or rather (ii) user-plane communication with a WCD served by the relay base station, wherein the relay-WCD passes to the relay base station downlink communications that the relay-WCD receives over the air interface from the donor base station, and wherein the relay-WCD transmits over the air interface to the donor base station uplink communications that the relay-WCD receives from the relay base station, wherein the instances of traffic differentially distributed comprise instances of traffic each selected from the group consisting of the downlink communications and the uplink communications, wherein the differentially distributing of the instances of traffic among the at least two carriers comprises (i) making a determination, per instance of the traffic, of whether the instance of traffic is control-plane communication with the relay base station or is rather user-plane communication with a WCD served by the relay base station, (ii) if the determination is that the instance of the traffic is control-plane communication with the relay base station rather than user-plane communication with a WCD served by the relay base station, then causing the instance of traffic to be communicated on the second carrier rather than on the first carrier, and (iii) if the determination is that the instance of the traffic is user-plane communication with a WCD served by the relay base station rather than control-plane communication with the relay base station, then causing the instance of traffic to be communicated on the first carrier rather than on the second carrier, and wherein making the determination of whether the instance of traffic is the control-plane traffic or is rather the user-plane traffic comprises (i) if the instance of traffic is downlink communication, then the donor base station making the determination based on a header value in the instance of traffic indicating whether the instance of traffic is the control-plane traffic or is rather the user-plane traffic, wherein the header value comprises an indication selected from the group consisting of a differential services point code (DSCP) value and a quality of service class indicator (QCI) value, and (ii) if the instance of traffic is uplink communication, then the donor base station making the determination based on signaling from the relay-WCD indicating whether the instance of traffic is the control-plane traffic or is rather the user-plane traffic, wherein the signaling from the relay-WCD comprises a scheduling request for the instance of traffic.

\* \* \* \* \*